Aug. 13, 1935.  C. W. SINCLAIR  2,011,326
ORNAMENTED VEHICLE RIM
Filed May 16, 1932
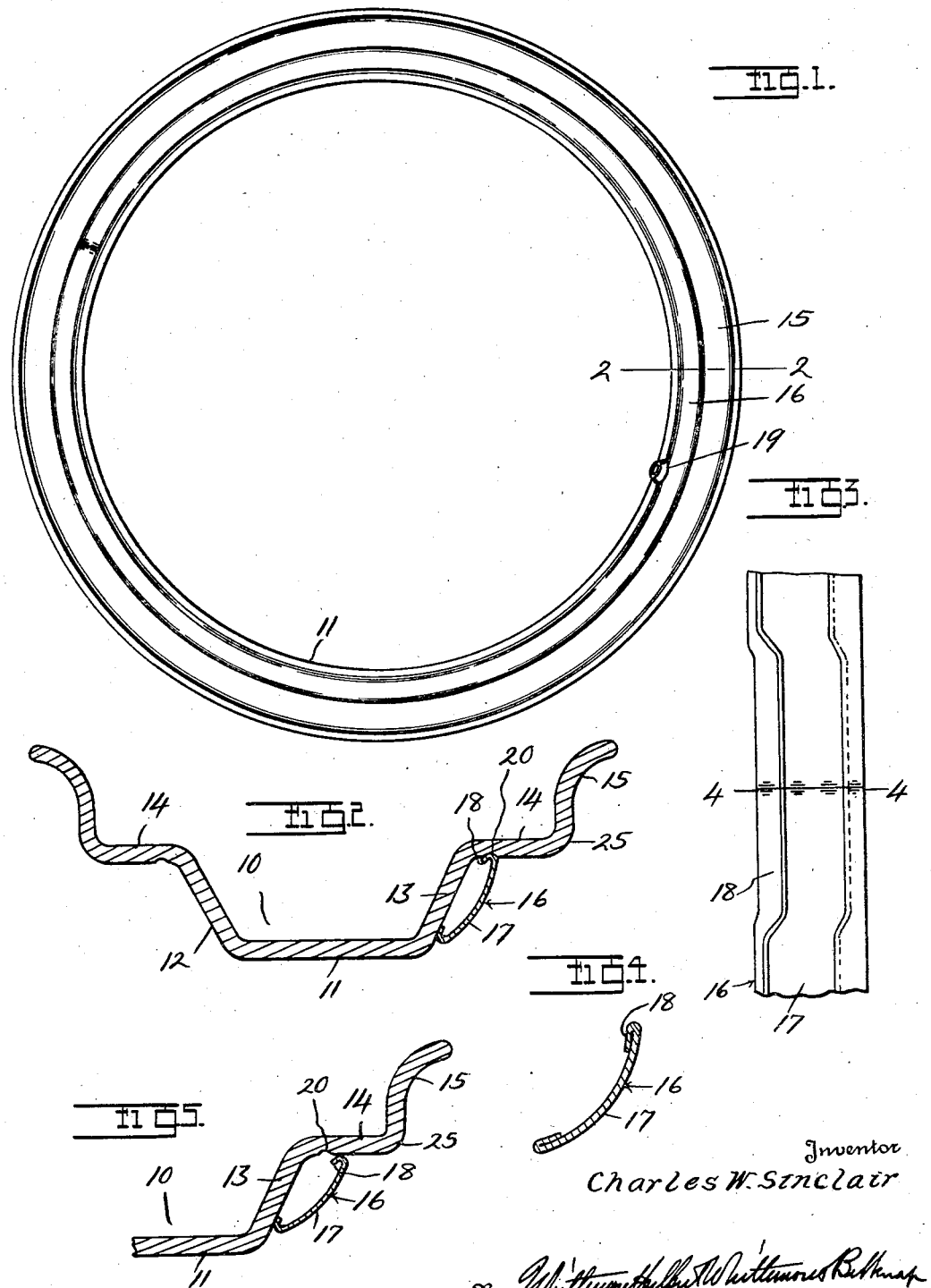
Inventor
Charles W. Sinclair Patented Aug. 13, 1935

2,011,326

UNITED STATES PATENT OFFICE 2,011,326

ORNAMENTED VEHICLE RIM

Charles W. Sinclair, Detroit, Mich., assignor, by mesne assignments, to The Kelsey-Hayes Wheel Company, Detroit, Mich., a corporation of Delaware Application May 16, 1932, Serial No. 611,681

3 Claims. (Cl. 41—10)

This invention relates to improvements in trim or appearance rings of the type generally employed in association with vehicle wheel rim members.

The present invention contemplates minimizing the cost of manufacture of vehicle wheels equipped with appearance rings by simplifying the method of forming the rings and also by facilitating the method of assembling the rings with the part or parts of the wheel to which the same are adapted to be applied.

One of the principal objects of the present invention which contributes materially to improving the efficiency of production consists in forming the appearance ring and portion of the wheel to which the latter is adapted to be applied of uniform predetermined size so that a prefashioned integral ring of standard size may be fitted with facility to any one of a number of vehicle wheels.

A further advantageous feature of the present invention resides in the provision of a method of forming and assembling appearance rings which provides for obtaining a strong and durable construction.

The foregoing as well as other objects will be made more apparent as this description proceeds, especially when considered in connection with the accompanying drawing, wherein:

Figure 1 is a front elevational view of a vehicle wheel illustrating an appearance ring constructed in accordance with this invention applied thereto;

Figure 2 is an enlarged cross sectional view taken substantially on the line 2—2 of Figure 1;

Figure 3 is a plan view of a portion of the appearance ring shown in Figure 1;

Figure 4 is a sectional view taken substantially on the line 4—4 of Figure 3;

Figure 5 is a view similar to Figure 2, showing how the ring is applied to the rim.

Although the appearance ring about to be described may be employed with facility in association with various parts or portions of a vehicle wheel, nevertheless, I have shown the same herein for the purpose of illustration as applied to the front side of a semi-drop center tire carrying rim member. The semi-drop center rim member selected for the purpose of illustrating the embodiment of the invention is best shown in Figure 2 and is provided with an annular well 10 substantially channel-shaped in cross section having a base 11 provided with outwardly projecting flanges or legs 12 and 13 respectively at the front and rear edges thereof. The flanges 12 and 13 are respectively provided at the free edges thereof with axially forwardly and rearwardly projecting annular portions 14. The annular portions 14 aforesaid are of arcuate predetermined external diameter so as to support pneumatic tires of standard dimension and terminate at the free edges thereof in substantially radially outwardly extending tire retaining flanges 15.

In order to enhance the general appearance of vehicle wheels equipped with rim members of the type specified above, suitable ornamental appearance rings may be secured to the front sides of the semi-drop center rims. The appearance ring employed herein is designated generally by the reference character 16 and is preferably in the form of an integral annulus secured to the front side of the rim member in advance of the flange or leg portion 12 of the latter. In detail, the ring is provided with a transversely bowed body portion 17 terminating at the marginal edges thereof in inwardly extending open return-bent portions 18 and having a depression 19 in the inner side thereof, affording clearance for the valve stem of a pneumatic tire supported upon the rim member. The outer marginal edge portion of the ring preferably engages within an annular groove 20 formed in the inner surface of the forwardly extending annular tire supporting portion 14 of the rim at a point spaced forwardly from the adjacent flange portion 12 of the ring and the inner marginal edge embraces the latter portion 12 of the rim adjacent the connection of the same with the base 11 of the well. Thus, it will be seen that the appearance ring not only serves to enhance the general appearance of the semi-drop center rim, but also provides a reinforcement for the forwardly extending tire supporting portion of the rim. In this connection, it is to be understood that the rear side of the tire carrying rim may also be provided with a similar appearance ring, if desired, in which event the construction hereinbefore described may be merely duplicated.

In forming the appearance ring, a strip of relatively light gauge stock of predetermined length is rolled or otherwise suitably fashioned to the desired transverse curvature illustrated in Figure 4, and the maginal edges of the strip are bent as at 18. Upon completion of the above operations, the strip is hooped and the free ends thereof butt-welded together to form an integral ring. The resulting ring is then subjected to a suitable sizing operation for forming the same circular and to an accurate predetermined diameter. Prior to welding the ends of the hooped strip together, the return-bent portions 18 adjacent the aforesaid ends are clamped against the body portion of the strip so as to facilitate the weld and provide a stronger joint therebetween. The depression 19 in the ring for the valve stem of the tire is preferably formed in the strip of stock intermediate the ends thereof prior to hooping the same so that upon completion of the ring, the depression assumes a position diametrically opposite the weld. The foregoing provides for securing a stronger and more durable construction.

In the present instance, the external diameter of the ring exceeds the internal diameter of the forwardly extending annular tire engaging portion 14 of the rim and is predetermined in dependence upon the diameter of the annular groove 20 which is accurately rolled to a predetermined diameter so as to provide for interchangeability of the rings and rim members inasmuch as the external diameter of the ring slightly exceeds the internal diameter of the aforesaid tire engaging portion 14 of the rim, the inner surface of the latter in advance of the annular groove 20 is accurately rolled or otherwise fashioned to a diameter predetermined with respect to the diameter of the groove and is formed truly circular so as to insure proper movement of the ring in assembled relation with the rim.

Referring now more in detail to the method of assembling the ring with the semi-drop center rim member, the former is merely positioned with respect to the latter and the two aforesaid elements are moved relatively toward each other in an axial direction. In the present instance, the outwardly curved annular portion 25 of the rim serves as a convenient positioning means for the ring, and the latter is preferably pressed into engagement with the rim by moving the same axially relative to the latter. Inasmuch as the internal diameter of the forwardly extending portion 14 is slightly less than the external diameter of the ring, movement of the periphery of the latter toward the groove 20 is resisted causing the inner marginal edge of the ring 16 to be displaced axially inwardly from its normal position relative to the periphery of the ring during the pressing operation. In other words, the above arrangement is such as to place the ring 16 under a slight tension upon assembling the same with the rim. When the inner marginal edge of the ring engages the front leg or flange 12 of the wheel 11, the periphery of the same assumes a position in proximity to the groove 20 so that upon completion of the pressing operation, the periphery of the ring snaps into engagement with the annular groove 20 causing the inner marginal edge of the same to move inwardly into firm engagement with the adjacent surface of the rim. In the event it is desired to insure tight fitting engagement of the marginal edges of the ring with the rim, additional pressure may be appplied to the ring after the latter is positioned in the manner specified above so as to flatten or increase the width of the ring and thereby firmly engage the marginal edges thereof with the adjacent portions of the rim. In other words, this latter arrangement provides for radially expanding the marginal edges of the ring to insure tight engagement of the periphery of the same within the groove irrespective of manufacturing inaccuracies.

While in describing the present invention particular stress has been placed upon the association of the appearance ring with the front side of a semi-drop center rim member, nevertheless, it is to be noted that by resorting to the same procedure, an appearance ring may be readily assembled with the rear side of the rim member as well. Furthermore, the above method of forming the ring as well as the method of fitting the same may be resorted to in securing the ring to various parts of vehicle wheels and various types of rim members, and, accordingly, reservation is made to make such changes in the construction as may come within the purview of the accompanying claims.

What I claim as my invention is:

1. A vehicle wheel rim having an outwardly extending circular flange and having a substantially axially extending annular flange provided with an annular groove in the inner surface thereof at a point spaced forwardly from the outwardly extending flange, and an endless appearance ring located within the annular axially extending flange with the inner edge slidably engageable with the outwardly extending flange and having the periphery thereof fashioned to snap into engagement with the groove.

2. A vehicle wheel rim having an outwardly extending circular flange and having a substantially axially extending annular flange at the outer end of the outwardly extending flange provided with an annular groove in the inner surface thereof, said annular flange having a predetermined internal diameter and the inner surface thereof being truly circular, and an endless appearance ring having a maximum diameter approximating the internal diameter of the annular flange to provide for sleeving the ring into the latter and having the inner edge spaced axially rearwardly beyond the outer edge a sufficient distance to provide engagement of the inner edge with the outwardly extending flange prior to registration of the outer edge with said groove, whereby continued pressure exerted upon the ring in a rearward direction causes the outer periphery of the ring to snap into engagement with the groove.

3. A vehicle wheel rim having an outwardly extending circular flange and having a substantially axially extending annular flange at the outer end of the outwardly extending flange, said annular flange having a predetermined internal diameter and the inner surface thereof being truly circular, an endless appearance ring having a maximum diameter approximating the internal diameter of the annular flange to provide for sleeving the ring into the latter and having the inner edge spaced axially rearwardly from the outer edge to provide engagement of the inner edge with the outwardly extending flange before the outer edge assumes its final rearwardmost position, whereby continued movement of the outer edge portion of the ring rearwardly places the ring under tension between said flanges.

CHARLES W. SINCLAIR.